United States Patent

Seybold

Patent Number: 6,128,007
Date of Patent: *Oct. 3, 2000

[54] METHOD AND APPARATUS FOR MULTI-MODE HANDWRITTEN INPUT AND HAND DIRECTED CONTROL OF A COMPUTING DEVICE

[75] Inventor: John L. Seybold, Palo Alto, Calif.

[73] Assignee: Motorola, Inc., Schaumburg, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/681,687

[22] Filed: Jul. 29, 1996

[51] Int. Cl.[7] ........................................ G09G 5/00
[52] U.S. Cl. ................................ 345/179; 345/174
[58] Field of Search ........................ 345/179, 180, 345/181, 182, 173, 156, 168, 145; 341/22; 178/18, 19

[56] References Cited

U.S. PATENT DOCUMENTS

| 4,707,845 | 11/1987 | Krein et al. | 178/19 |
| 4,720,781 | 1/1988 | Crossland et al. | 340/825.35 |
| 4,825,209 | 4/1989 | Sasaki et al. | 340/825.72 |
| 5,148,155 | 9/1992 | Martin et al. | 178/18 |
| 5,225,637 | 7/1993 | Rodgers et al. | 178/19 |
| 5,402,151 | 3/1995 | Duwaer | 345/179 |
| 5,523,775 | 6/1996 | Capps | 345/179 |
| 5,545,857 | 8/1996 | Lee et al. | 345/173 |
| 5,748,185 | 5/1998 | Stephan et al. | 345/173 |

FOREIGN PATENT DOCUMENTS 61-223972  4/1986  Japan.

*Primary Examiner*—Dennis-Doon Chow
*Attorney, Agent, or Firm*—Terri S. Hughes; Romi N. Bose

[57] ABSTRACT

Coordinates from a digitizing tablet are processed in two modes. In a first mode (denoted the Cursor Mode for convenience) the digitizing tablet operates similar to the well know computer "mouse" allowing the user to move the cursor around the display screen to select buttons and controls by mapping the coordinates to the display area of the monitor. In a second mode (denoted as the Input Mode for convenience), the digitizing tablet coordinates (especially generated by the motion of a pen) are mapped to an input area within a graphical interface of a computer program designed to accept handwritten input. Selection between the first mode and the second mode is made manually by switch input or automatically via analysis of the coordinates or by differentiating field sensing digitization from touch sensitive digitization.

30 Claims, 7 Drawing Sheets

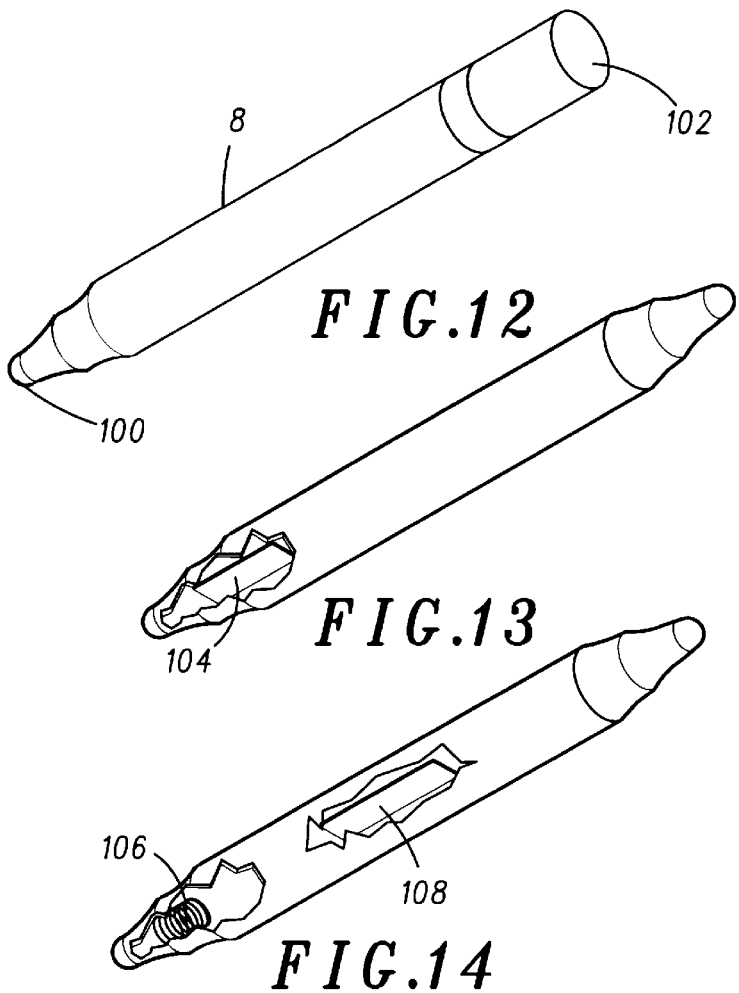
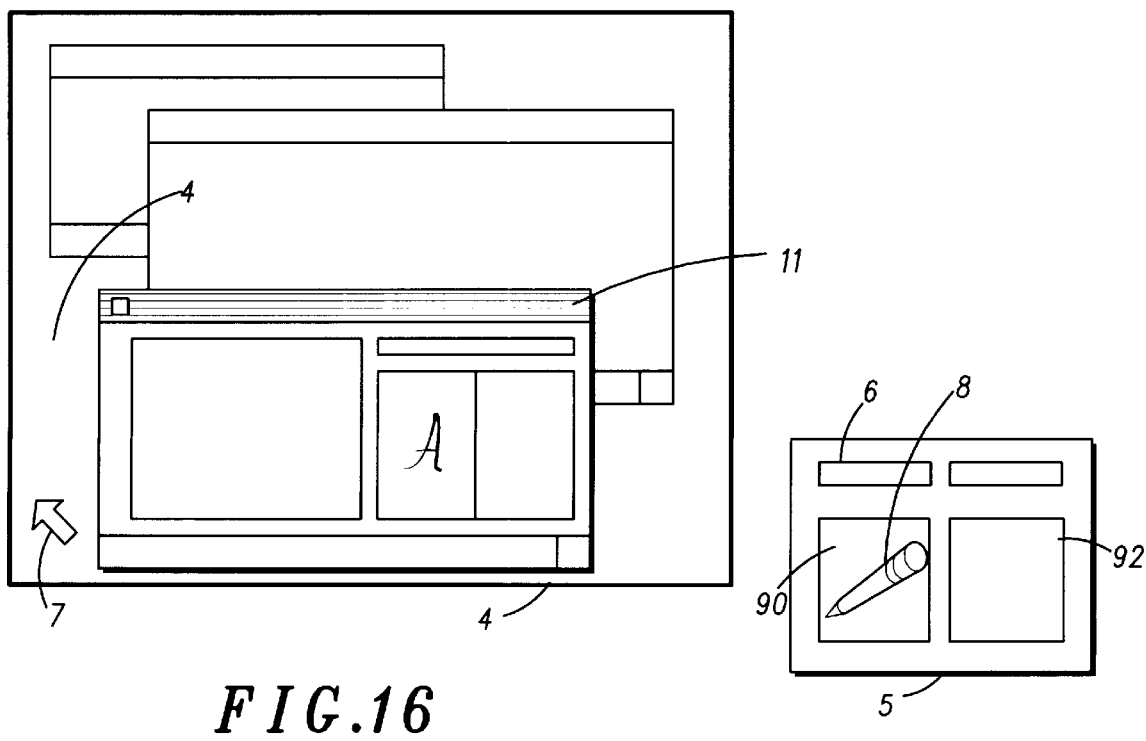
FIG.12
FIG.13
FIG.14
FIG.16

METHOD AND APPARATUS FOR MULTI-MODE HANDWRITTEN INPUT AND HAND DIRECTED CONTROL OF A COMPUTING DEVICE

FIELD OF THE INVENTION

This invention relates generally to computing devices having digitizing input elements, and more particularly to hand-directed control and handwritten input techniques for such computing devices.

BACKGROUND OF THE INVENTION

In many cases it is desirable to enter information into a computer using handwriting instead of a keyboard. This is the case with many Asian languages, for example, where the large number of characters makes it difficult to use a keyboard to type information. One solution is to use handwriting recognition software to translate natural handwriting into machine readable characters. The handwriting is collected by a digitizing surface that records the position of a pen or stylus at frequent intervals, thereby providing a series of coordinates representing the hand directed movement of the stylus (the handwriting) to the handwriting recognition program.

In some cases, a transparent digitizing surface is integrated with a display, which echoes the motion of the pen or stylus by representing electronically on an integral display where the pen has touched the surface (commonly referred to by those skilled in the art as "ink"). Unfortunately, digitizing displays are expensive, and so a more typical solution is to have an opaque digitizing tablet beside a computer, and to use a standard display or monitor to present the ink. While less expensive, this approach has a number of problems such as the user cannot simultaneously look at their pen and the computer display as they write thereby increasing the difficulty of targeting their handwriting appropriately. One solution is to manufacture the digitizing tablet so that it corresponds exactly to the writing area on the display to allow the user to sense by tactile feedback the boundaries of the writing area. Unfortunately, display writing areas can vary widely between manufacturers. Also, a user would not be able to also use the digitizing tablet for cursor control since the user would be not able to direct the cursor outside the of the writing area. The current invention is designed to remedy these problems and provide an extremely simple and low cost input solution that allows both targeted writing and the ability to access computer and other controls around the rest of the display screen.

BRIEF DESCRIPTION OF THE DRAWINGS

FIG. 12 is a more detailed illustration of the pen or stylus shown in FIGS. 10 and 11;

FIG. 13 and FIG. 14 are illustrations of another preferred pen or stylus for use in accordance with the dual mode operation of FIG. 7;

FIG. 16 is an illustration of an alternate embodiment in accordance with the present invention.

DETAILED DESCRIPTION OF A PREFERRED EMBODIMENT

According to the preferred embodiment of the invention, coordinates (or a series of coordinates) from a digitizing tablet are processed in two modes. In a first mode (denoted as the Cursor Mode for convenience) the digitizing tablet operates similar to the well know computer "mouse" allowing the user to move the cursor around the display screen to select electronic buttons and controls. To do this, coordinates provided by the digitizing tablet are mapped or correlated to the display area of the screen or monitor. Such digitizing tablets are commonly referred to as "trackpads", such as those integrated into various notebook computers (see FIG. 2). In a second mode (denoted as the Input Mode for convenience), the digitizing tablet coordinates (especially generated by the motion of a pen) are mapped or correlated with an input area within a graphical interface of a computer program designed to accept handwritten input. For example, handwriting recognition programs (cursive or print character), drawing programs and graphics programs are generally more readily used via hand directed input.

Optionally, a transparent digitizing surface may be integrated with a tablet to echo the motion of the pen or stylus by representing electronically on an integral tablet display where the pen has touched the surface (commonly referred to by those skilled in the art as "ink"). As one option, preferably determined and set by the user, the ink could be echoed in both the Cursor Mode and the Input Mode. As another option, however, many users may find it more convenient to have the integral tablet display automatically adapt with mode changes to echo ink in the Input Mode, but not to echo ink in the Cursor Mode so that handwriting input may be seen without displaying extraneous ink that likely would result from cursor control movement in the Cursor Mode.

Figure 1:
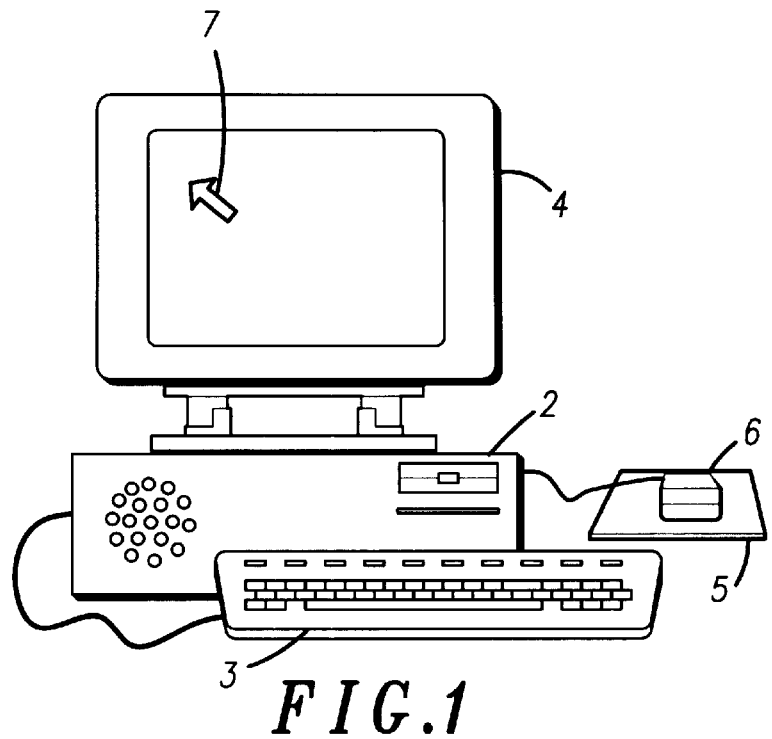
FIG. 1 is an illustration of a desk-top computer system suitable for use with the present invention.

FIG. 1 illustrates a computer 2 having a display (or monitor) 4 and a keyboard 3. In this example, an external pointing/control element (commonly referred to as a "mouse") has been replaced by a tablet 5 to control the position of a cursor 7 on the display 4. Control (or "select") buttons 6 are also provided on the tablet 5 and are commonly used to control the computer or programs running on the computer as is commonly known.

Figure 2:
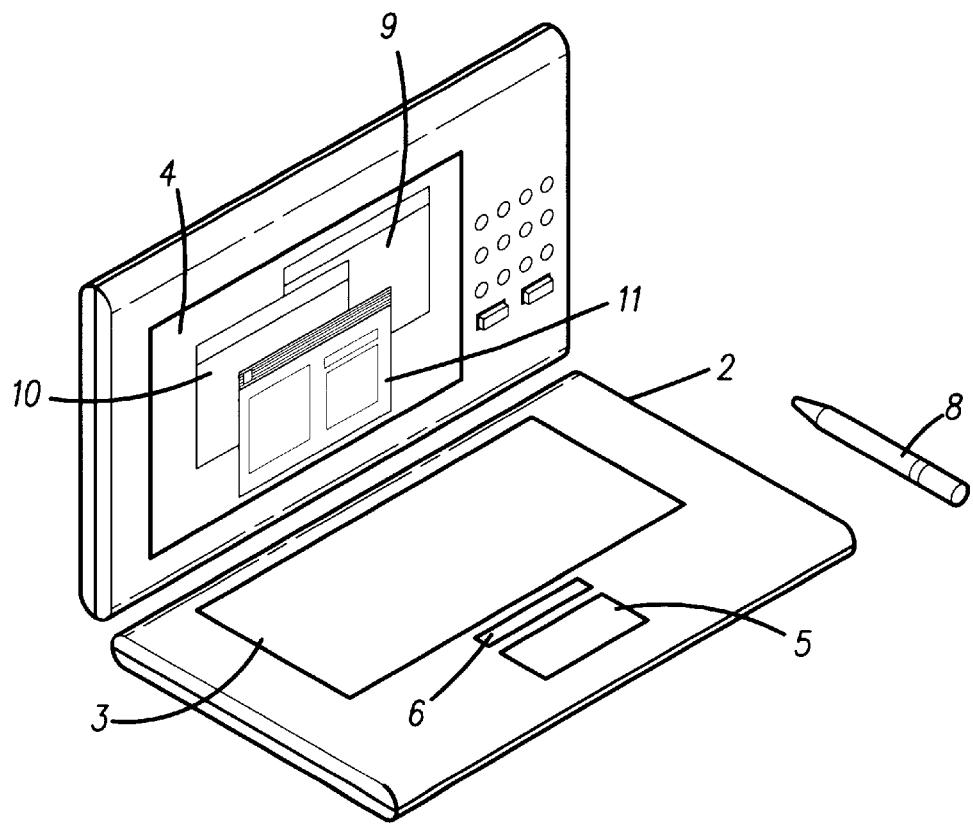
FIG. 2 is an illustration of a lap-top computer system suitable for use with the present invention.

FIG. 2 is a computer system illustrated in a lap-top configuration where the tablet 5 and control buttons 6 have been integrated into the computer housing. Typically, the tablet (or trackpad) is used by touching a finger or stylus 8 to a surface of the tablet, which sends digitized coordinates (or a series of coordinates in the case of movement) of the stylus activity on the tablet to the computer, which in turn, presents a cursor on the display and controls its movement relative to the movement of the stylus on the tablet.

Figure 3:
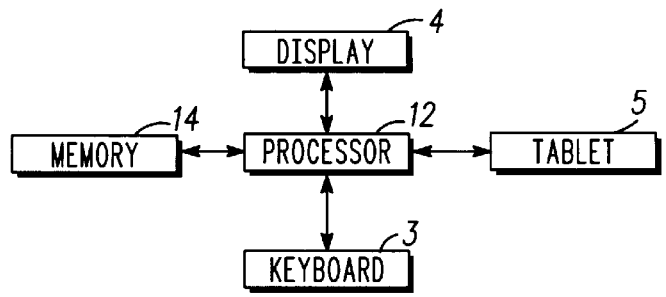
FIG. 3 is an exemplary block diagram of the computer of FIG. 1 or FIG. 2.

FIG. 3 illustrates a block diagram of a contemporary computing system that includes a processing component 12 such as a microprocessor or digital signal processor that, together with other general circuitry, execute the instructions of one or more software programs residing in a memory 14 that typically includes an operating system to control the functionality and operation of the computing device 2. According to the invention a conventional digitizing tablet 5 may be used to enter handwritten information (e.g., words, text, or graphics) for controlling the computer operation.

Figure 4:
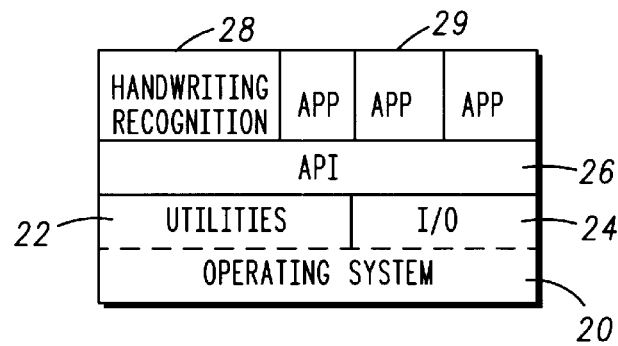
FIG. 4 is a graphic diagram illustrating an exemplary software program configuration of the device of FIG. 3 in accordance with the present invention.

FIG. 4 illustrates a software program arrangement in accordance with the present invention to enable the computing device 2 of FIG. 1 or FIG. 2 to utilize the present invention. Overall control of the computing device is governed by an operating system 20. Typical operating systems includes utility programs 22 and input/output (I/O) 24 control, and generally interfaces with other software programs (28, 29) via an application programming interface (API) 26. In the preferred embodiment, a software program 28 residing above the API layer and includes instructions and data to implement handwriting recognition (for example, the Longhand cursive handwriting recognition program or the QuickPrint print recognition program, both by the Lexicus Division of Motorola).

Several contemporary computer operating systems provide a graphical user interface using a window motif. For example, the Windows '95 operating system from Microsoft Corporation and the MAC operating system from Apple Computer associate a graphical image (window) with computer application programs or other computer programs (28, 29) that facilitate user interaction with (and use of) the various computer programs. In FIG. 2, the display 4 may be seen to present several windows 9–11 that are commonly referred to by those skilled in the art as being open (since they are displayed). Each window is associated with a computer application program or other computer program. Generally however, only one window is referred to as being the "active" window, which typically is presented front-most on the display 4 with other open windows (9 and 10) appearing beneath or behind the active window (11). As illustrated in FIG. 2, the active window 11 is (for purposes of understanding the present invention) associated with a handwriting recognition program 28 of FIG. 4 and includes a portion of the window area where handwritten text is presented.

Figure 5:
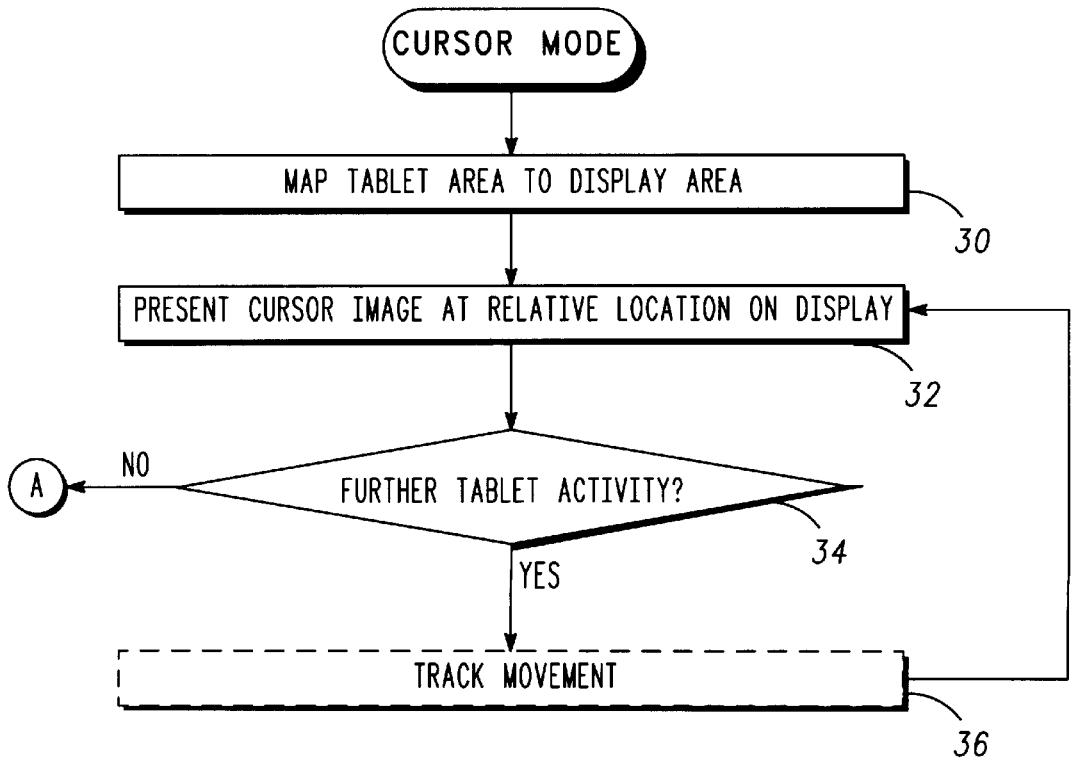
FIG. 5 is a flow diagram illustrating the operation of one mode in accordance with the present invention.

As mentioned above, a preferred embodiment of the present invention processes coordinates (or a series thereof) from a digitizing tablet in two modes. FIG. 5 illustrates the operation of a first mode (Cursor Mode). In the Cursor Mode, the tablet area is mapped (corresponds) to the display area of a computer monitor (step 30). This allows activity anywhere on the tablet to be translated in a relative positional sense to the display so that a cursor will appear in a corresponding display area (step 32). Thus, upon detection of stylus movement on the tablet (decision 34), information comprising digital coordinates representing the activity of the stylus can be sent to the computer so that the relative movement of the stylus can be presented as a moving cursor on the computer display (step 36), and optionally, echoed to a transparent digitizing surface and integral tablet display.

Figure 6:
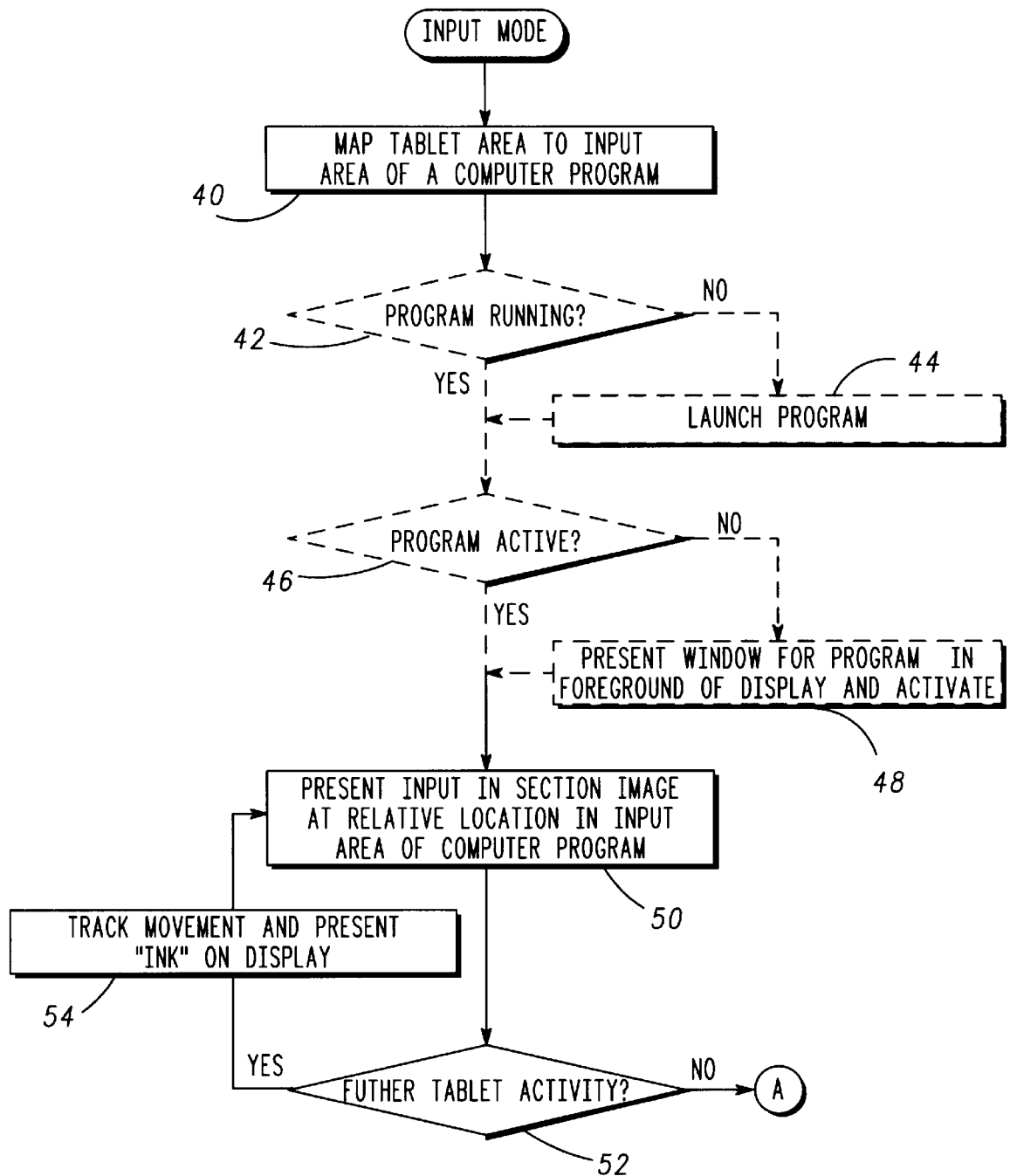
FIG. 6 is a flow diagram illustrating the operation of a second mode in accordance with the present invention.

FIG. 6 illustrates the operation of a second mode for processing coordinates from a digitizing tablet (Input Mode). In the Input Mode, step 40 maps the tablet area with a handwriting entry area in a portion of a window associated with a handwriting recognition program (for example 28 in FIG. 4) or graphical drawing or illustration program (29). Optionally, should the Input Mode be entered while the handwriting recognition (or graphical) program is not open (decision 42), the handwriting recognition program can be automatically launched (opened) via step 44. Similarly, if the handwriting recognition program is open but inactive (decision 46), the handwriting recognition program can be activated and its associated window presented in the foreground of the display (step 48). Once the handwriting recognition program is active and the tablet area mapped to the handwriting entry area, the present invention contemplates that the conventional cursor image (commonly an arrow; see 7 in FIG. 1) is replaced with another image (perhaps a stylus image) to provide visual identification to the user of which mode is currently active (step 50). Thereafter, tablet activity (stylus movement) detected via decision 52 signals step 54 to track and present stylus movement to the user on the display as digital "ink", and optionally, echo the ink to a transparent digitizing surface and integral tablet display.

The preferred embodiment of the present invention controls movement between the dual modes (Cursor Mode and Input Mode) automatically for the convenience of the user. Accordingly, a preferred embodiment contemplates that the tablet contain a combination of two layers. A top layer is preferable a conventional capacitance sensing layer that detects the presence of a finger (or stylus) and sends pressure sensitive coordinate information to the computer. A bottom layer is preferably an electromagnetic (EM) sensing layer that detects the motion of a specially made pen or stylus and sends field sensitive coordinate information to the computer. EM technology is preferred for this second layer because it can detect the pen at a significant distance from the tablet, and in fact, prior to physical contact with the tablet. Thus, in FIG. 7, when decision 56 detects field (such as EM field) activity prior to physical contact tablet activity (decision 58), the Input Mode of FIG. 6 is entered. Conversely, for tablet activity detected (decision 60) without prior field activity, the Cursor Mode of FIG. 5 is entered. In this way, users can input handwritten text with the pen when desired and move the cursor around the display with their finger or any other pen or stylus that the EM layer would not detect.

Figure 8:
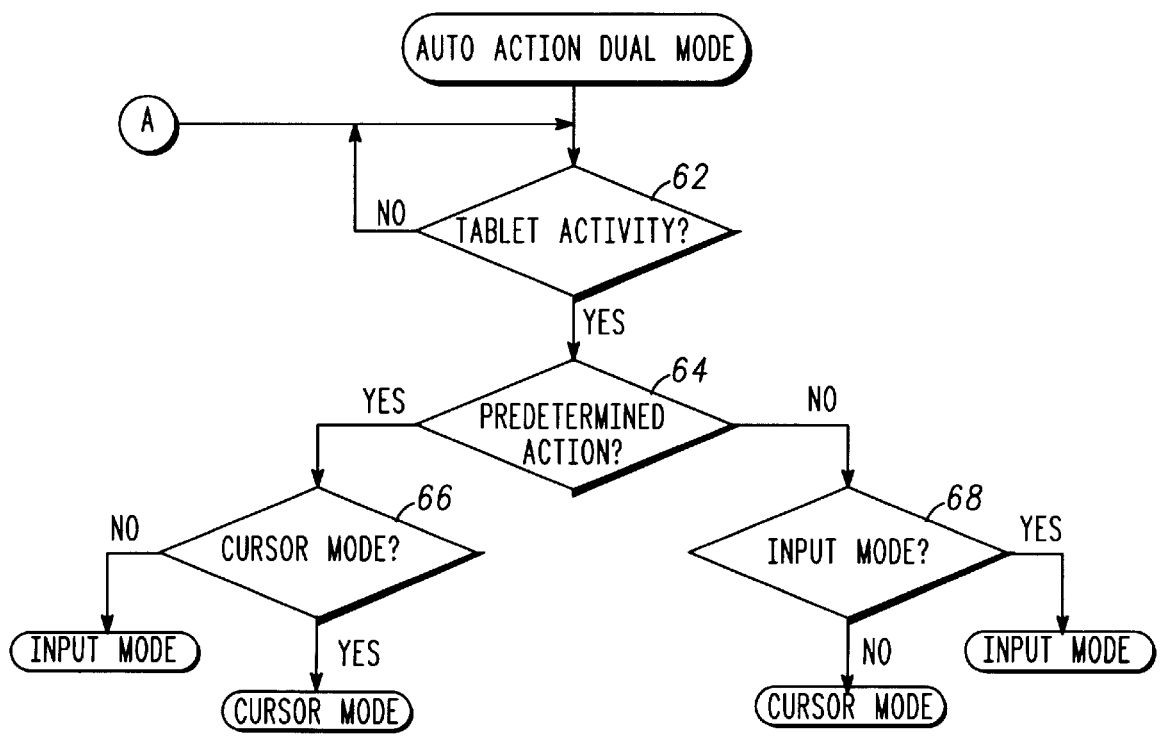
FIG. 8 is a flow diagram illustrating another preferred method of automatically moving between the operational modes of FIG. 5 and FIG. 6.

Another preferred dual mode embodiment employs a single layer (preferably pressure sensitive for cost reasons) and operates to detect mode control parameters comprising a predetermined movement pattern of the pen or stylus (that generates a predetermined series of digital coordinates from the tablet). FIG. 8 illustrates the operation of this embodiment by first detecting tablet activity (decision 62) and checking for some predetermined stylus movement (decision 64), such as, for example, a triangular movement (i.e., $\Delta$), or a Greek symbol (e.g., $\Sigma$, $\phi$, $\pi$, $\Omega$). According to the invention, any symbol can be used, however, preferably, a symbol is selected that is not ordinarily present in the language used by the handwriting recognition program to prevent unintended mode changes. If the predetermined action is detected (decision 64), such as, via comparison with patterns stored in memory, decision 66 operates to change the operational mode while decision 68 maintains the present operational mode in the absence of the predetermined action detection. In this way, the control parameter for changing operational modes is contained in the series of coordinates associated with actual computer control or input information. Naturally, it is possible to have one pattern for changing from the Cursor Mode to the Input Mode and a different pattern for changing from the Input Mode to the Cursor Mode.

Still another preferred dual mode embodiment employs a single pressure sensitive layer and operates to detect the difference between the point-like pressure profile of a pen tip in contact with the tablet and a broader pressure profile of a finger or a more blunt end of a stylus. Accordingly, when decision 70 of FIG. 9 detects tablet activity, a determination is made (decision 72) as to whether the pressure profile exceeds a threshold value stored in the memory of the computer. More concentrated point-like pressure indicative of the tip of a stylus preferably falls below the threshold and triggers use of the Input Mode, while a broader pressure profile above the threshold causes the Cursor Mode to become active.

Figure 9:
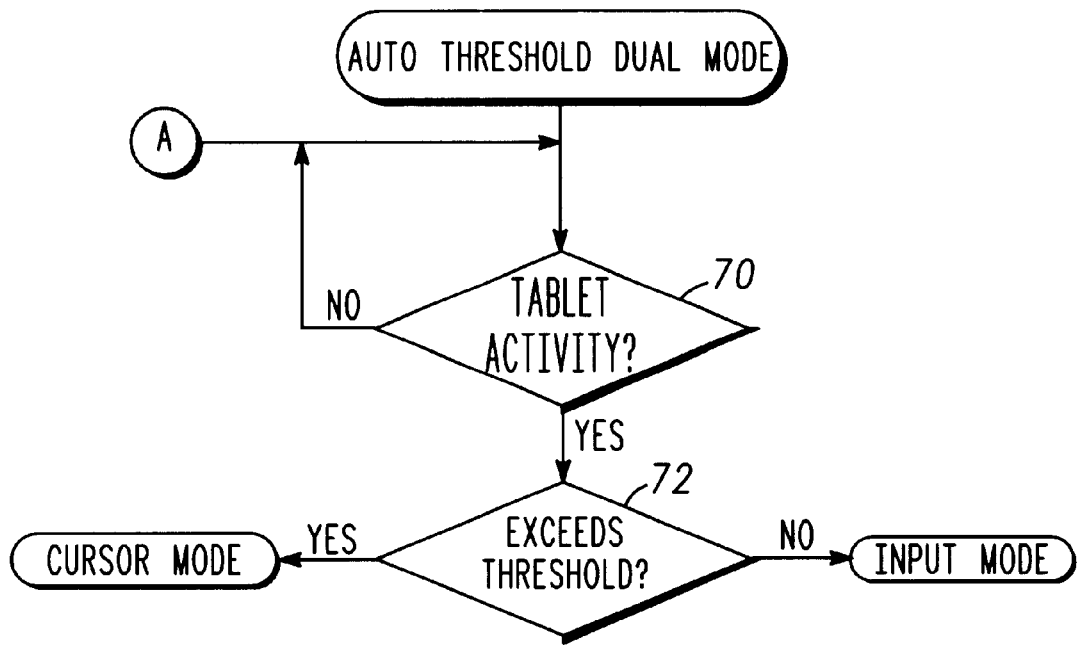
FIG. 9 is a flow diagram illustrating another preferred method of automatically moving between the operational modes of FIG. 5 and FIG. 6.
Figure 10:
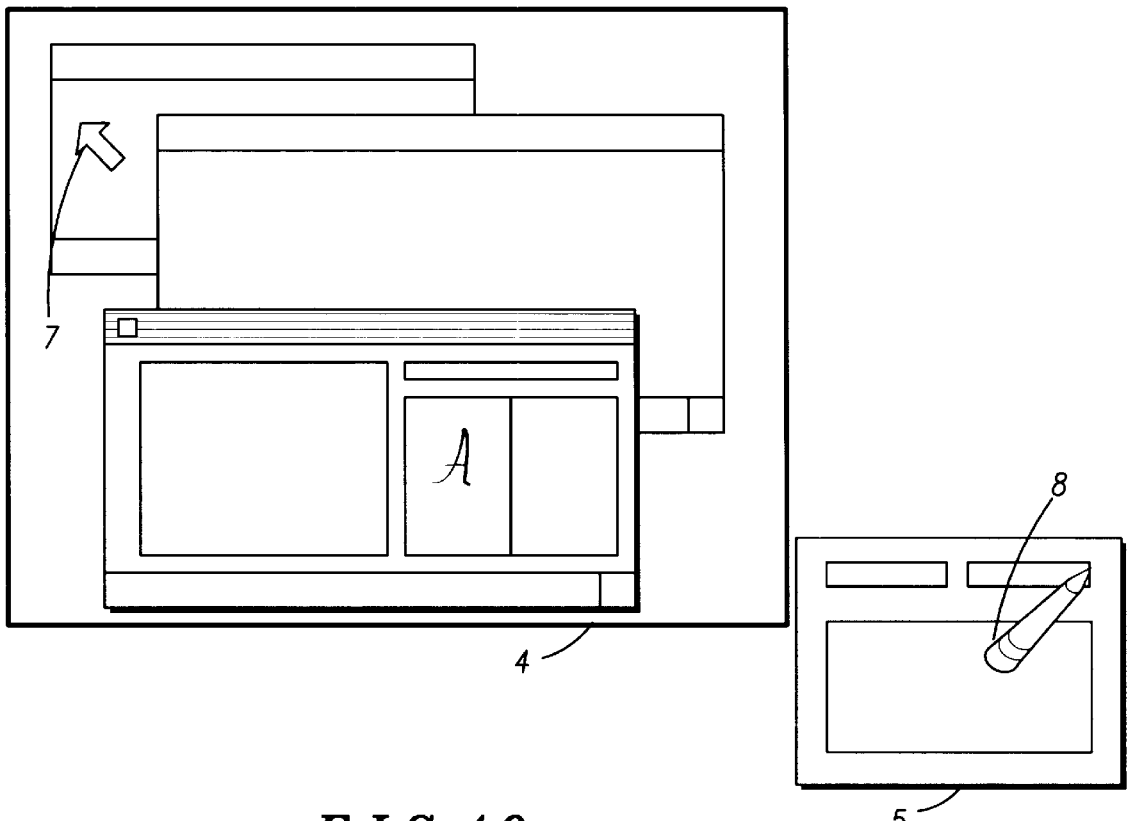
FIG. 10 and FIG. 11 illustrate the dual mode operation of FIG. 9.
Figure 11:
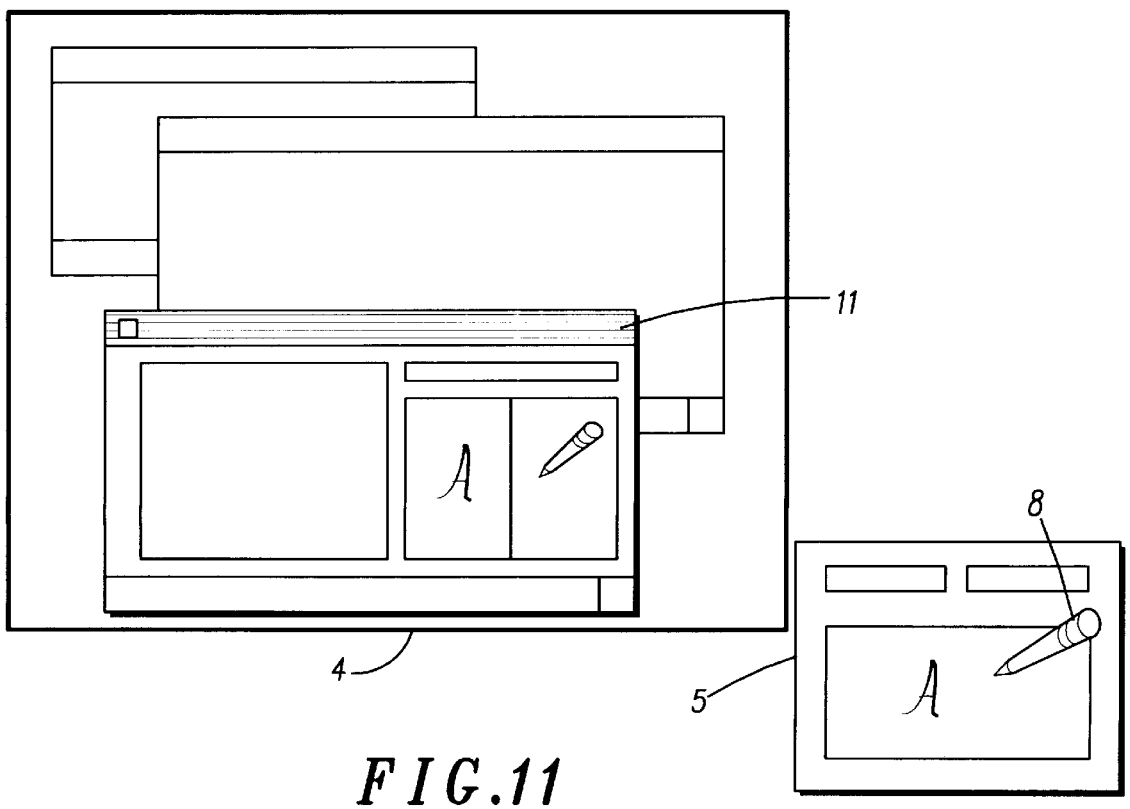

The auto-threshold dual mode operation of FIG. 9 can be further illustrated with reference to FIGS. 10–12. In FIG. 10, the display 4 and tablet 5 are illustrated where a blunt end of the stylus 8 is in contact with the tablet 5. In accordance with the method illustrated in FIG. 9, the Cursor Mode becomes active and the cursor 7 is presented in display 4. Conversely, FIG. 11 shows the point-like tip of the stylus 8 in contact with the tablet 5, resulting in the Input Mode being used to input text into a handwritten input area of the active window 11 associated with a handwriting recognition program. FIG. 12 illustrates an exemplary stylus 8 that could be used to selectively apply a point-like pressure profile (end 100) and broad pressure profile (end 102). FIG. 12 also illustrates the optional echoing of ink back to an integral tablet display in the Input Mode that facilitates user interaction by visual illustration of the correspondence of the tablet area to the handwriting entry area in a portion of a window associated with a handwriting recognition program.

Figure 7:
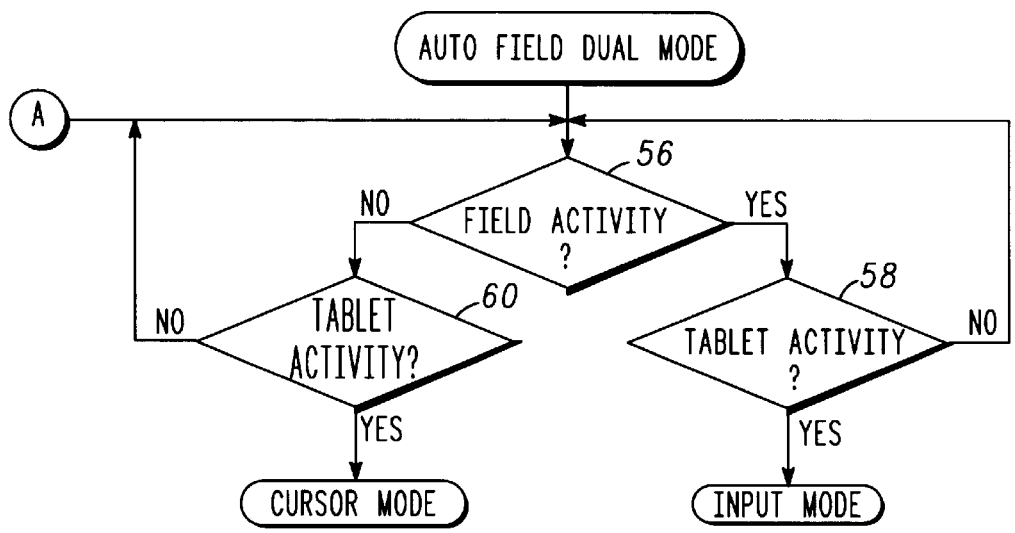
FIG. 7 is a flow diagram illustrating a preferred method of automatically moving between the operational modes of FIG. 5 and FIG. 6.

FIGS. 13 and 14 illustrate exemplary stylus arrangements for the dual mode operation presented in FIG. 7. In FIG. 13, one end of the stylus contains a permanent magnet 104 that can be sensed via conventional techniques in field sensing tablets. Alternately, it is known that a field can be radiated from the stylus via a coil 106 and associated circuitry 108 that can be detected by contemporary field sensing tablets.

Figure 15:
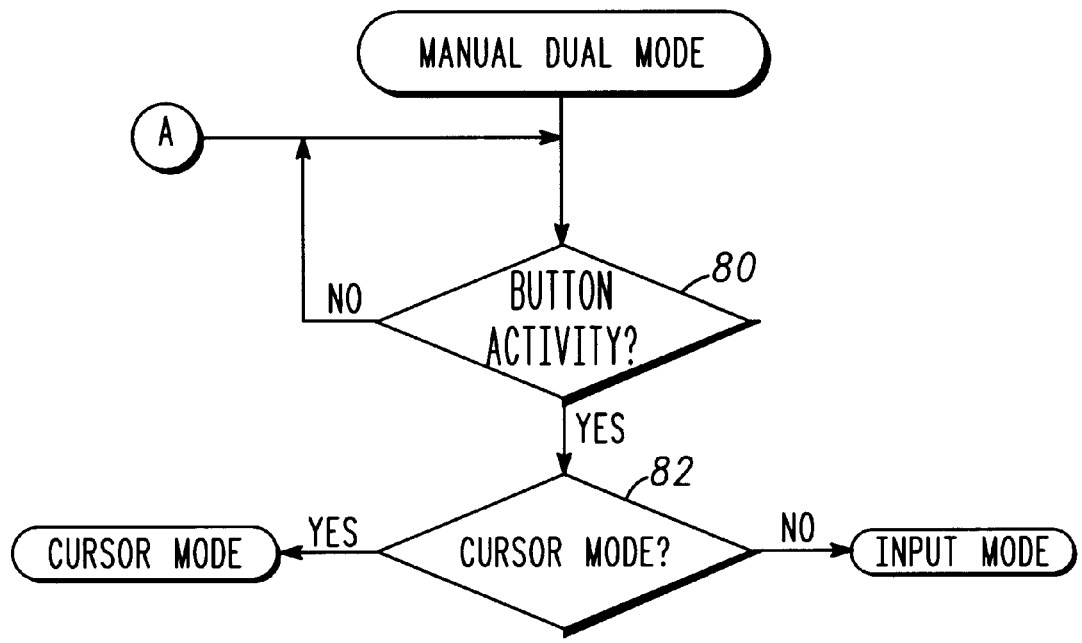
FIG. 15 is a flow diagram illustrating a preferred method of manually moving between the operational modes of FIG. 5 and FIG. 6.

FIG. 15 illustrates a manual embodiment that is preferred for simple and low cost implementations. Decision 80 checks for manual button activity such as the control buttons 6 of the tablet 5 as shown in FIGS. 1 and 2. Upon detection of manual button activity, decision 82 operates to toggle from one mode to the other mode. Naturally, a predetermined area of the tablet (EM or pressure sensitive) could be reserved as a touch area that sends a predetermined code to the computer (for comparison with a stored code in memory) when touched by the stylus to emulate a mechanical control switch as a so-called "soft key" to toggle between the Cursor Mode and the Input Mode.

FIG. 16 is an illustration of an alternate embodiment to achieve dual mode control in a single unit by incorporating two tablet surfaces (90 and 92) into one housing. As shown in FIG. 16, activity in the left-most tablet 90 activates the Cursor Mode wherein the cursor 7 is presented on the display 4. Activity on the right-most tablet 92 would cause the Input Mode to become active wherein stylus movement on the tablet 92 would be mapped into the handwriting input area of the handwriting recognition window 11.

In this way, the dual mode (Cursor Mode and Input Mode) operation of the present invention facilitates user computer control and handwritten input in a single device. The automatic mode change embodiments provide greater ease of use, while the more manual user involved embodiments afford the benefits of the present invention for minimal cost.

What is claimed is:

1. A method, comprising the steps of:

receiving coordinate information in a cursor input area;

processing pressure sensitive coordinate to create cursor-coordinate information in a non-inking cursor mode for a display area of a graphical interface for a computer program;

receiving coordinate information in an inking input area, wherein the cursor input area and the inking input area are coextensive;

processing coordinate information received in the inking input area, to create ink input information in a inking input mode for an input area of the graphical interface for the computer program; and switchlessly activating one of the input areas to enable automatic detection of the input mode.

2. The method of claim 1, which includes the step of launching the computer program having the input area within the graphical interface when the computer program is not yet running and responsive to a change of operation from the cursor mode to the inking input mode mode.

3. The method of claim 1, which includes the step of presenting the graphical interface with the input area in a foreground position within the display area when the computer program is running and a change of operation from the cursor mode to the inking input mode mode is detected.

4. The method of claim 1, which includes the step of presenting a first image at a corresponding display location within the display area in the cursor mode and presenting a inking input mode image at a corresponding input location within the input area of the graphical interface of the computer program in the second mode.

5. The method according to claim 1 further comprising automatically switching from the non-inking cursor mode to an inking input mode when field sensitive coordinate information is detected.

6. The method according to claim 5 wherein the step of automatically switching from the non-inking cursor mode to the inking input mode occurs only when the field sensitive coordinate information is detected within a handwriting entry area.

7. The method according to claim 5 further comprising returning to the non-inking cursor mode when field sensitive coordinate information is no longer detected.

8. A method for controlling data input on a digitizing device using an input device, comprising the steps of:

receiving coordinate information in a cursor input area and coordinate information in an inking input area, wherein the cursor input area and the inking area are coextensive;

processing coordinate information received from the cursor input area to create cursor coordinate information and coordinate information received from the inking input area to create ink input information representing coordinates of a digitizing area of a digitizing device to map the coordinate information from the digitizing area to a display area of a display device for presentation of an image at a corresponding display location in a non-inking cursor mode, and in an inking input mode to map coordinate information from the digitizing area to an input area of a graphical interface for a computer program capable of accepting handwritten or hand-drawn input for presentation of a second image at a corresponding input location to facilitate entry of the handwritten or hand-drawn input within the input area of the graphical interface; and switchlessly activating one of the input areas to enable automatic detection of the input mode in response to the type of input device being used to provide the coordinate information.

9. The method of claim 8, which includes the step of launching the computer program having the input area within the graphical interface when the computer program is not yet running and responsive to a change of operation from the cursor mode to the inking input mode mode.

10. The method of claim 8, which includes the step of presenting the graphical interface with the input area in a foreground position within the display area when the computer program is running and a change of operation from the cursor mode to the inking input mode mode is detected.

11. The method of claim 8, which includes the step of echoing or displaying on an integral tablet display the presentation of the second image at the corresponding input location on the tablet to facilitate entry of the handwritten or hand-drawn input.

12. A device, comprising:

a cursor input area for receiving coordinate information;

an inking input are for receiving coordinate information, wherein the cursor input area and thinking input area are coextensive;

a field sensing and pressure sensing digitizing element having a digitizing area and capable of providing field sensitive and pressure sensitive coordinate information representing locations of activity within the digitizing area; and processing circuitry capable of mapping pressure sensitive coordinate information to a display area of a display device and for mapping field sensitive coordinate information to an input area of a graphical interface for a computer program, the processing circuitry switchlessly enabling activation of one of the input areas.

13. The device of claim 12, which includes a memory having the computer program stored therein and wherein the processing circuitry is capable of launching the computer program when the computer program is not yet running and responsive to a detection of field sensitive coordinate information.

14. The device of claim 12, which includes a display for presenting the graphical interface of the computer program and wherein the processing circuitry is capable of presenting the graphical interface with the input area in a foreground position within the display area when the computer program is running and responsive to a detection of field sensitive coordinate information.

15. A device, comprising:

a digitizing input device, having a cursor input area, a capacitance sensing layer, an input inking area and an electromagnetic sensing layer, wherein the cursor and inking input provide pressure sensitive coordinate information and field sensitive coordinate information representing handwritten or hand directed input;

a memory having an operating system and application programs stored therein, and including at least one application program capable of accepting handwritten input;

a display device having a display area for presenting icons for command and control functions and icons representing the application programs, for presenting graphical interfaces for one or more running application programs; and digital processing circuitry including a programmable digital processing device capable of processing the pressure sensitive coordinate information to map the pressure sensitive coordinate information to the display area of the display device in a first mode and in a second mode for mapping the field sensitive coordinate information to an input area of a graphical interface for the at least one application program capable of accepting handwritten input, the digital processing circuitry automatically and switchlessly changing from the first mode to the second mode.

16. The device of claim 15, wherein the digital processing circuitry is capable of launching a predetermined application program capable of accepting handwritten input when such application program is not yet running and responsive to a change from the non-inking cursor mode to the inking input mode.

17. The device of claim 15, wherein the digital processing circuitry is capable of presenting the graphical interface with the input area in a foreground position within the display area when the application program capable of accepting handwritten input is running and responsive to a change from the first mode to the second mode.

18. The device according to claim 15 wherein the programmable digital processing device is further capable of automatically switching from the non-inking cursor mode to the inking input mode when field sensitive coordinate information is detected.

19. The device according to claim 18 wherein the programmable digital processing device is further capable of returning to the non-inking cursor mode when field sensitive coordinate information is no longer detected.

20. The method according to claim 18 wherein the step of automatically switching from the non-inking cursor mode to the inking input mode occurs only when the field sensitive coordinate information is detected within a handwriting entry area.

21. A method of automatically controlling movement between a cursor mode and an input mode on a digitizing tablet using an input device, the method comprising:

providing a cursor input area and an inking input area on the digitizing tablet, wherein the cursor and inking input areas are coextensive;

providing a capacitance sensing layer and an electromagnetic sensing layer on the digitizing tablet;

operating in an input mode when field activity is detected prior to tablet activity with the digitizing tablet;

operating in a cursor mode when tablet activity with the digitizing tablet is detected without prior field activity; and automatically switching between the input mode and the cursor mode in response to the input device being used.

22. The method according to claim 21 wherein the step of operating in an inking input mode further comprises:

sending field sensitive coordinate information to a computer; and mapping the field sensitive coordinate information to an input area within a graphical interface of a computer program.

23. The method according to claim 22 further comprising echoing the field sensitive coordinate information to a transparent digitizing surface and integral tablet display.

24. The method according to claim 21 wherein the step of operating in a non-inking cursor mode further comprises:
   sending pressure sensitive coordinate information to a computer; and
   mapping the pressure sensitive coordinate information to a display area of a screen.

25. The method according to claim 24 further comprising echoing the pressure sensitive coordinate information to a transparent digitizing surface and integral tablet display.

26. The method according to claim 21 further comprising providing a stylus which contains a magnet, that can be sensed by the electromagnetic sensing layer, to produce field activity prior to tablet activity with the digitizing tablet.

27. The method according to claim 21 further comprising providing a stylus which contains a coil and associated circuitry, that can be sensed by the electromagnetic sensing layer, to produce field activity prior to tablet activity with the digitizing tablet.

28. The method according to claim 21 further comprising integrating a transparent digitizing surface with a tablet to echo a motion of a stylus by representing electronically on an integral tablet display where the stylus has touched the transparent digitizing surface.

29. The method according to claim 28 wherein areas in which the stylus has touched the transparent digitizing surface are echoed in the non-inking cursor mode to create cursor coordinate information and the inking input mode to create ink input information.

30. The method according to claim 28 wherein the integral tablet display only echoes the motion of the stylus to create ink input information when operating in the inking input mode.

* * * * *